United States Patent
Kobori

[11] Patent Number: 5,283,486
[45] Date of Patent: Feb. 1, 1994

[54] STEPPING MOTOR

[75] Inventor: Masaru Kobori, Kashiwa, Japan

[73] Assignee: Oriental Motor Kabushiki Kaisha, Tokyo, Japan

[21] Appl. No.: 914,461

[22] Filed: Jul. 17, 1992

[30] Foreign Application Priority Data

Dec. 13, 1991 [JP] Japan .................. 3-352478

[51] Int. Cl.$^5$ .................. H02K 37/02
[52] U.S. Cl. .................. 310/49 R; 310/216; 310/254
[58] Field of Search .................. 310/49 R, 254, 191, 310/216, 256

[56] References Cited

U.S. PATENT DOCUMENTS

| | | | |
|---|---|---|---|
| 4,262,353 | 4/1981 | Okazaki et al. | 310/49 R X |
| 4,801,832 | 1/1989 | Neumann | 310/216 |
| 4,831,301 | 5/1989 | Neumann | 310/216 |
| 4,983,867 | 1/1991 | Sakamoto | 310/49 R |
| 5,179,306 | 1/1993 | Nasar | 310/14 |

Primary Examiner—Steven L. Stephan
Assistant Examiner—Judson H. Jones
Attorney, Agent, or Firm—Jacobson, Price, Holman & Stern

[57] ABSTRACT

With this invention, realized is the maximum torque which should be generated given a value for the outer diameter dimension of a stator in a hybrid type stepping motor. In a hybrid type stepping motor 21 composed of a rotor with a plurality of teeth provided at equal pitches on a peripheral surface and a stator having a plurality of salient poles provided so as to oppose to the peripheral surface of the rotor through an air gap, the ratio of the inside diameter Di of the stator 22 to the outer diameter Do thereof is set between 0.62 and 0.64 in the case of a two-phase stepping motor and between 0.605 and 0.625 in the case of a five-phase stepping motor in order to generate the maximum torque from the rotor 23.

2 Claims, 6 Drawing Sheets

FIG. I

STEPPING MOTOR

FIELD OF THE INVENTION AND RELATED ART STATEMENT

The present invention relates to a hybrid type stepping motor and more particularly to an improvement in the construction of a stator thereof.

As a conventional example for this type of stepping motor, a motor is shown in the sectional view of FIG. 5 and in the a relationship between a stator and a rotor of is illustrated.

In these figures, a hybrid type two-phase stepping motor 1 for instance is composed of a stator 2 and a rotor 3. A stator pole 2a of the stator 2 has a plurality of teeth 2b. Also, a plurality of teeth 3a are provided at the periphery of the rotor 3. Moreover, a permanent magnet 5 magnetized in the axial direction of an output shaft 4 is incorporated in the rotor 3, and iron cores 6 and 7 each having the plurality of teeth are located on the outside of the permanent magnet 5, respectively. The iron core 6 is magnetized into an N pole, the iron core 7 is magnetized into an S pole, and these teeth are offset by half of a pitch, i.e., by 180° in an electrical phase angle.

On the stator 2, in addition to brackets 8 and 9 and a motor winding 10 (which is a two-phase bifilar winding in the example shown in the figure), bearings 11 and 12 for supporting the rotor 3 rotatably are disposed in the brackets 8 and and assembled by screws or the like. Furthermore, the output shaft 4 of the rotor 3 protrudes outwardly, penetrating through the bearing 12 and the bracket 9 on one side, and outputs mechanical motive force generated by the motor 1 at a predetermined step angle.

In such a conventional stepping motor 1, however, the ratio of inside diameter to outer diameter of the stator 2 (hereinafter referred to simply as the diameter ratio) is slightly over 0.5 (more specifically approximately 0.53). Thus, the maximum torque which is expected to be generated due to the outer diameter dimension of the stator cannot actually be obtained from the rotor in the stepping motor 1.

OBJECT AND SUMMARY OF THE INVENTION

The present invention has been made to overcome the above problem. It is an object of the present invention to solve the above-mentioned problem and provide a hybrid type stepping motor in which the maximum torque which is expected to be generated for a given dimension of the outer diameter of the stator thereof can be realized.

The structure of the present invention for achieving the above-mentioned object is as follows:

(1) A hybrid type two-phase stepping motor comprising a rotor with a plurality of teeth disposed at equal pitches on a peripheral surface and a stator having a plurality of salient poles disposed so as to oppose to the peripheral surface of the rotor through an air gap, characterized in that the ratio of inside diameter to outer diameter of the stator is set between 0.62 and 0.64.

(2) A five-phase stepping motor of the above-mentioned hybrid type, characterized in that said diameter ratio of the stator is set between 0.605 and 0.625 for the same purpose as above.

The torque generated by a motor is normally given by a product obtained by a magnetic flux $\Phi$ passing through a main pole (above-mentioned salient pole) multiplied by a magnetomotive force (AT) of a winding.

For a hybrid type stepping motor, with the inside diameter of the stator being defined as Di, the magnetic flux $\Phi$ is proportional to this inside diameter Di, and the magnetomotive force (AT) is proportional to the square root of a winding area S(Di) where the winding is possible. Here, the winding area S(Di) is expressed as a function of the inside diameter Di.

Thus, a generated torque T of the stepping motor is expressed by the following equation:

$$T \propto \Phi(AT) \propto Di\sqrt{S(Di)}, \tag{1}$$

The value of the inside diameter Di of the stator which allows the generated torque T of the stepping motor to reach its maximum is given as a solution of an equation, $dT/dDi=0$, in which Equation (1) above is differentiated with respect to Di and the resulting derivative is set equal to zero. That is, $dT/dDi=0$.

This equation may be expressed as:

$$S(Di)+Di\{dS(Di)/dDi\}=0. \tag{2}$$

The inside diameter Di of the stator which gives the maximum torque can be obtained from Equation (2). By optimizing the diameter ratio of the stator, it is possible to realize the maximum rotor torque which can be achieved for a given value of the outer diameter of the stepping motor rotor.

Further, when the dimension of the outer diameter of the stator is given, it is possible to easily determine the inside diameter of the stator with which the maximum torque is obtainable.

According to the present invention, since the diameter ratio of the stator in a stepping motor of hybrid type is set between 0.62 and 0.64 in case of a two-phase motor, or between 0.605 and 0.625 in case of a five-phase motor, it is possible to obtain from the rotor of the motor the maximum torque which can be generated for a given dimension of outer diameter of the stator in the motor, and also easy to determine the inside diameter of the stator with which the maximum torque can be obtained given the outer diameter dimensions described above.

DETAILED DESCRIPTION OF A PREFERRED EMBODIMENT

A preferred embodiment of the present invention will be described hereafter in detail illustratively with reference to the drawings.

Figure 1:
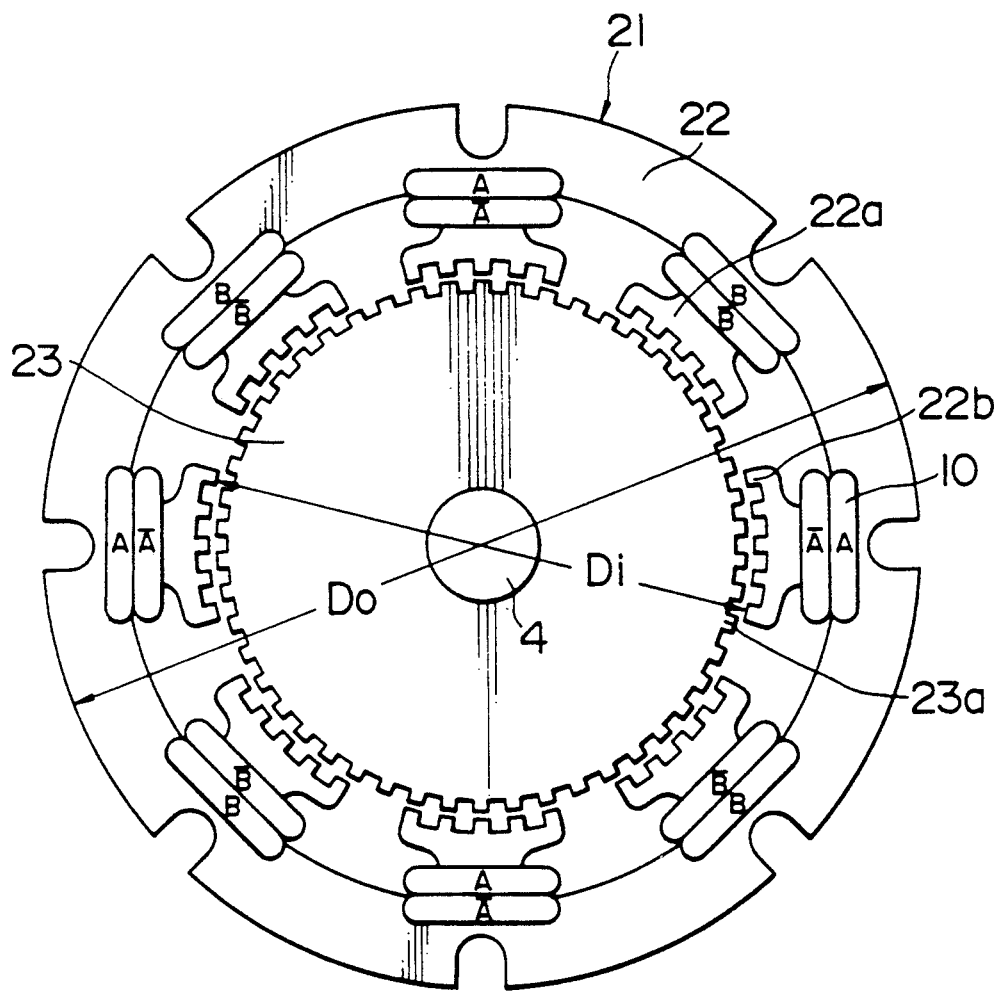
FIG. 1 is a diagram showing a relationship between the stator and the rotor for an embodiment of the stepping motor of the present invention.
Figure 6:
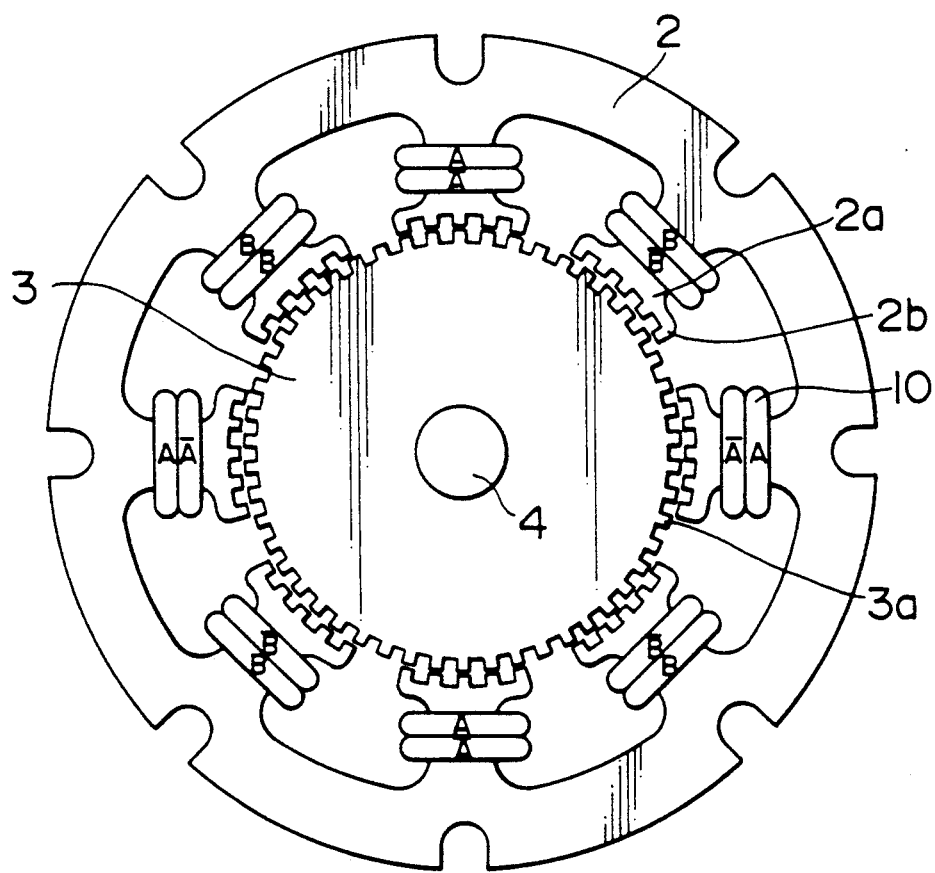
FIG. 6 is a diagram showing a relationship between the stator and the rotor of the stepping motor shown in FIG. 5.

FIG. 1 is a relationship diagram between the stator and the rotor for an embodiment of the stepping motor of the present invention. In FIG. 1, the same reference numerals are affixed to members that are the same as those shown in FIG. 6, and the description thereof will be omitted.

In FIG. 1, a hybrid type stepping motor 21 is composed of a stator 22 and a rotor 23, and a plurality of teeth 22b are provided on a stator pole 22a of the stator 22, and a plurality of teeth 23a are also provided on the periphery of the rotor 23. Further, Di represents the inside diameter of the stator 22, and Do represents the outer diameter thereof in FIG. 1.

Figure 2:
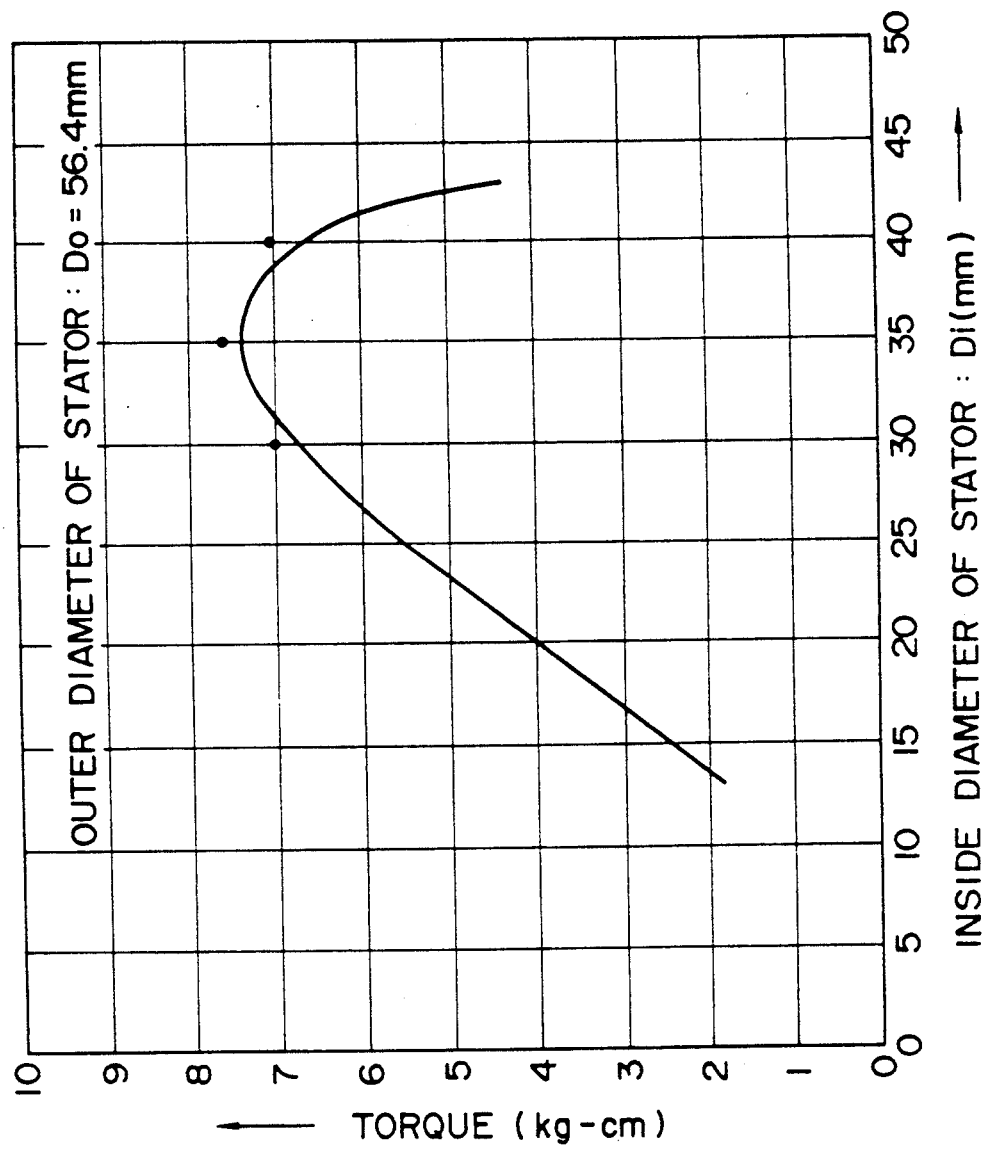
FIG. 2 is a diagram showing a relationship between the inside diameter of a stator and a generated torque when the outer diameter of the stator is fixed.

FIG. 2 is a graph showing a variation of torque generated as the inside diameter Di is varied based on Equation (2) above, assuming that the outer diameter of the stator is 56.4 mm. The solid line in the figure shows the result obtained by numerical calculation, and the black points show actual values confirmed with a prototype stepping motor. The existence of an optimum value of the inside diameter Di for generating the maximum torque was confirmed with FIG. 2.

Figure 3:
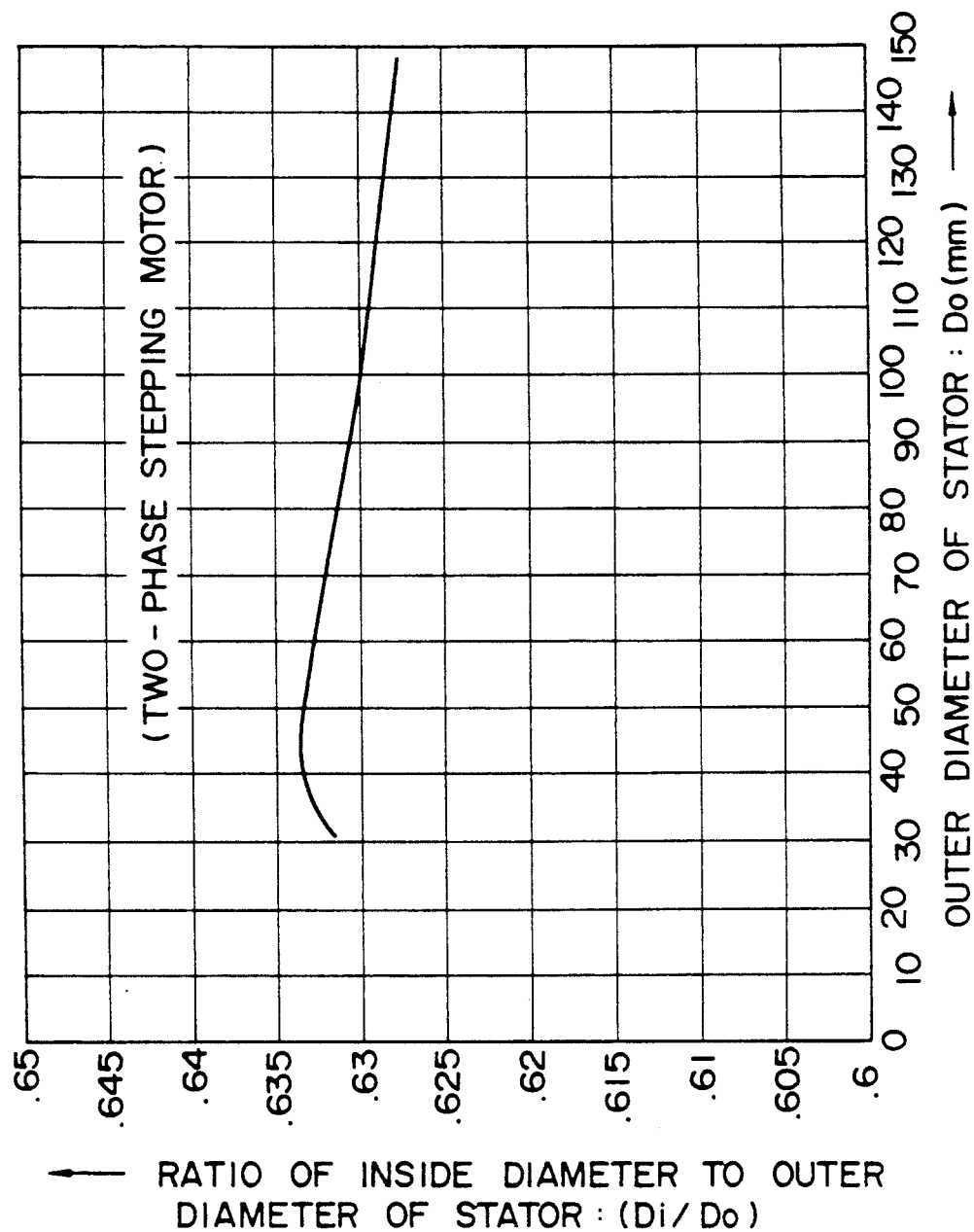
FIG. 3 is a diagram showing a relationship between the outer diameter of the stator and the optimum diameter ratio in a two-phase stepping motor in the present embodiment.
Figure 4:
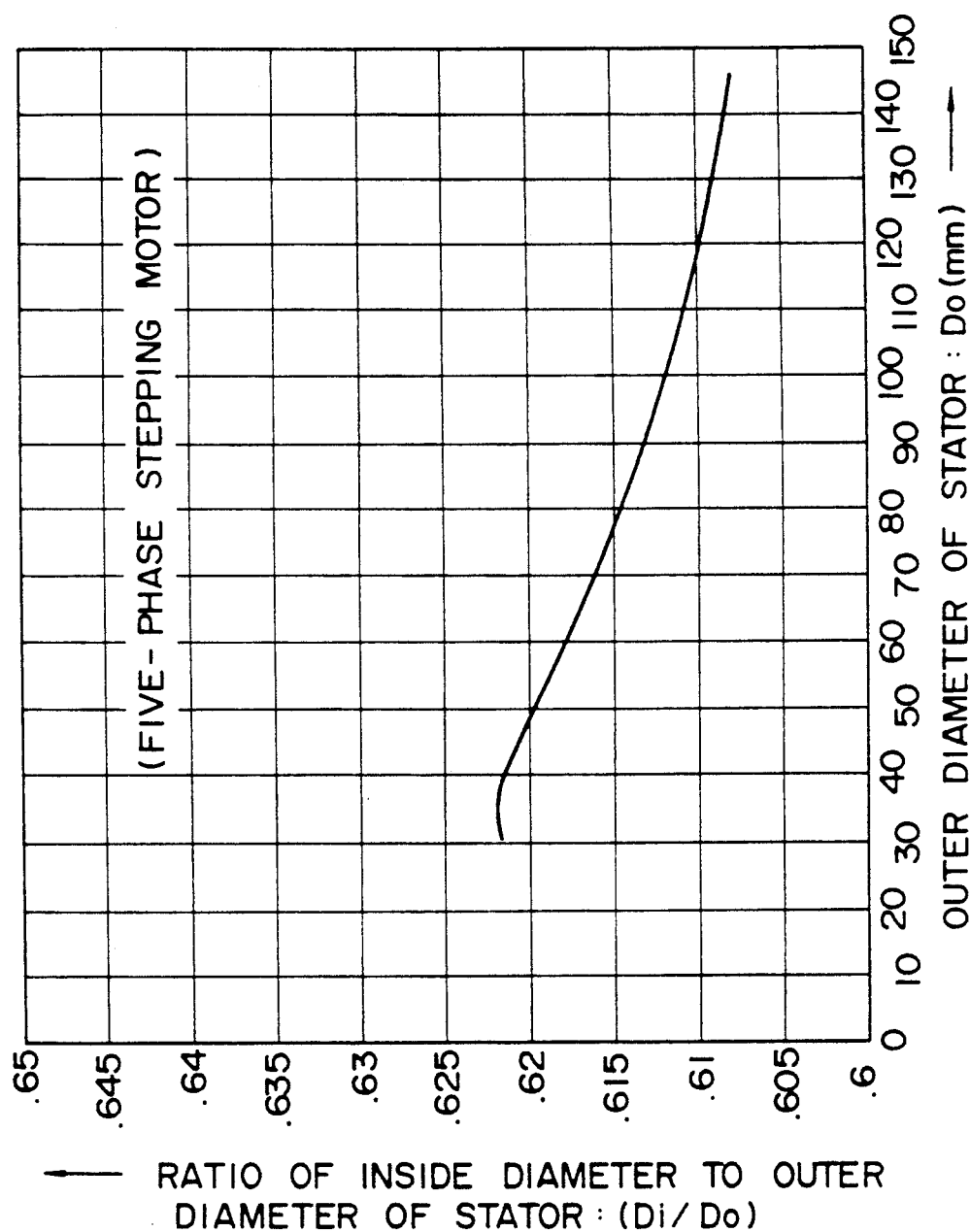
FIG. 4 is a diagram showing a relationship between the outer diameter of the stator and the optimum diameter ratio in the five-phase stepping motor of the present embodiment.
Figure 5:
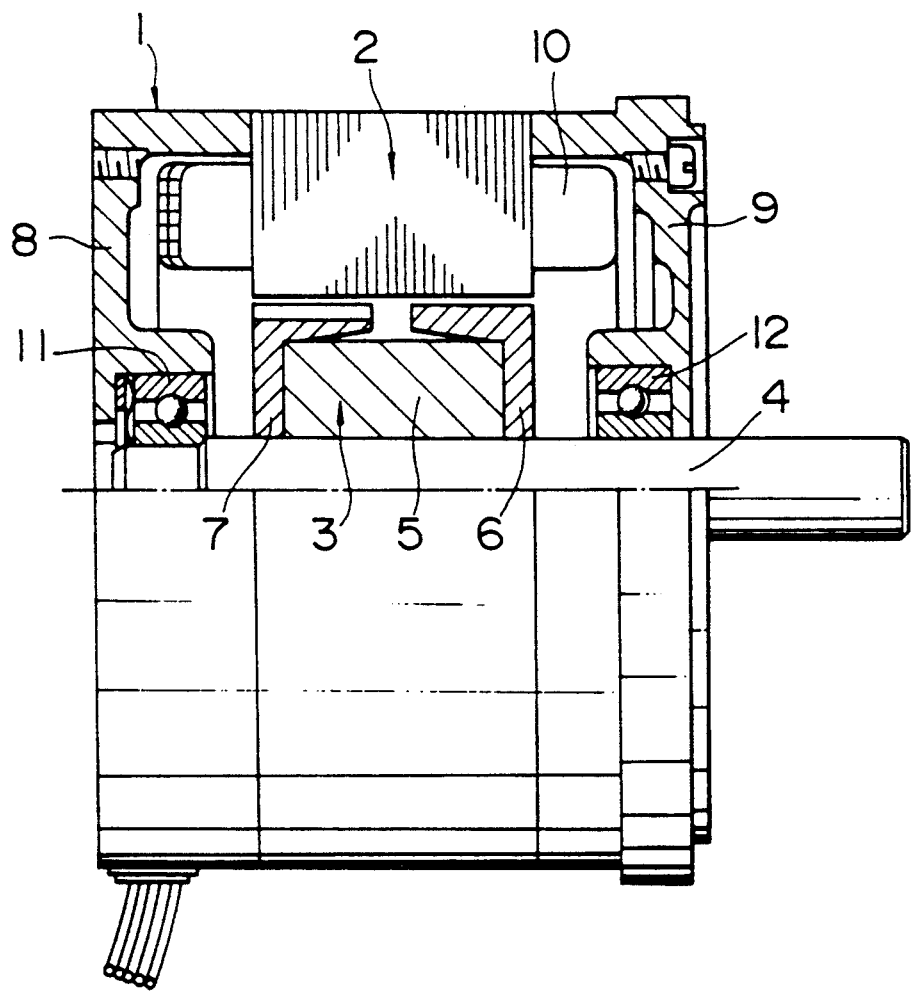
FIG. 5 is a partial sectional view showing a construction of a conventional hybrid type stepping motor.

Next, the inside diameter Di of the stator is found for generating the maximum torque with respect to given values for the outer diameter Do of the stator, and these values of the diameter ratio are shown in FIG. 3 for a two-phase stepping motor and in FIG. 4 for a five-phase stepping motor, respectively.

It can be seen from FIGS. 3 and 4 that $0.63 \pm 0.01$ in the case of a two-phase stepping motor and $0.615 \pm 0.01$ in the case of a five-phase stepping motor are optimum diameter ratios, respectively, with respect to the diameter ratio of the above-mentioned stator 22 for generating the maximum torque from the rotor 23.

Incidentally, the techniques of the present invention are not limited to the above-mentioned embodiment, but other variations of means for fulfilling similar functions may also be utilized, and furthermore, the techniques of the present invention may be changed or modified within the scope of the structure described above.

I claim:

1. A hybrid type two-phase stepping motor comprising a rotor with a plurality of teeth provided at equal pitches on a peripheral surface thereof and a stator having a plurality of salient poles provided facing the peripheral surface of said rotor through an air gap, the ratio of an inside diameter to an outer diameter of said stator being between 0.62 and 0.64 to generate maximum torque from said rotor.

2. A hybrid type five-phase stepping motor comprising a rotor with a plurality of teeth provided at equal pitches on a peripheral surface thereof and a stator having a plurality of salient poles provided facing the peripheral surface of said rotor through an air gap, the ratio of an inside diameter to an outer diameter of said stator being between 0.605 and 0.625 to generate maximum torque from said rotor.

* * * * *